United States Patent [19]
Cloeren

[11] Patent Number: 5,256,052
[45] Date of Patent: Oct. 26, 1993

[54] EXTRUSION PROCESS AND APPARATUS WITH MODIFIED PRELAND

[75] Inventor: Peter F. Cloeren, Orange, Tex.

[73] Assignee: The Cloeren Company, Orange, Tex.

[21] Appl. No.: 22,766

[22] Filed: Feb. 25, 1993

Related U.S. Application Data

[60] Continuation of Ser. No. 852,825, Mar. 13, 1992, abandoned, which is a continuation of Ser. No. 653,067, Feb. 8, 1991, abandoned, which is a division of Ser. No. 550,516, Jul. 10, 1990, abandoned.

[51] Int. Cl.$^5$ .............................................. B29C 47/00
[52] U.S. Cl. ................................ 425/133.5; 264/171; 264/176.1; 425/382.4; 425/466; 425/467
[58] Field of Search ................... 425/133.5, 376.1, 381, 425/382.4, 461, 462, 464, 465, 466, 467; 264/176.1, 171

[56] References Cited

U.S. PATENT DOCUMENTS

| | | | |
|---|---|---|---|
| 2,387,718 | 10/1945 | Coleman | 425/462 |
| 3,057,010 | 10/1962 | Reifenhäuser | 425/466 |
| 3,360,823 | 1/1968 | Tyrner | 425/466 |
| 3,759,653 | 9/1973 | Schreiber | 425/461 |
| 3,825,645 | 7/1974 | Fayet | 425/376.1 |
| 3,860,383 | 1/1975 | Sirevicius | 425/461 |
| 4,043,739 | 8/1977 | Appel | 425/461 |
| 4,217,322 | 8/1980 | Sugano et al. | 425/461 |
| 4,372,739 | 2/1983 | Vetter et al. | 425/466 |
| 4,600,550 | 7/1986 | Cloeren | 425/462 |
| 4,780,258 | 10/1988 | Cloeren | 425/462 |
| 4,789,513 | 12/1988 | Cloeren | 425/462 |

OTHER PUBLICATIONS

Cloeren Extrusion Apparatus O.
Wortberg, in *Berechnung von Extruderwerkzeugen*, VDI Verlag, 1978, pp. 97–126.
Gormar, Dissertation RWTH Aachen, 1968.
Cloeren Coextrusion Apparatus O (draft specification, claims and drawing).

*Primary Examiner*—David A. Simmons
*Assistant Examiner*—William J. Matney, Jr.
*Attorney, Agent, or Firm*—Timothy Kroboth

[57] ABSTRACT

The present invention provides a novel extrusion apparatus including a flow channel having a modified preland channel that functions as a flow transition zone. The flow transition zone changes the widthwise flow volume of a stream passing therethrough so as to provide for substantially equal flow volume of the stream across the flow channel width as the stream exits from the transition zone.

17 Claims, 4 Drawing Sheets

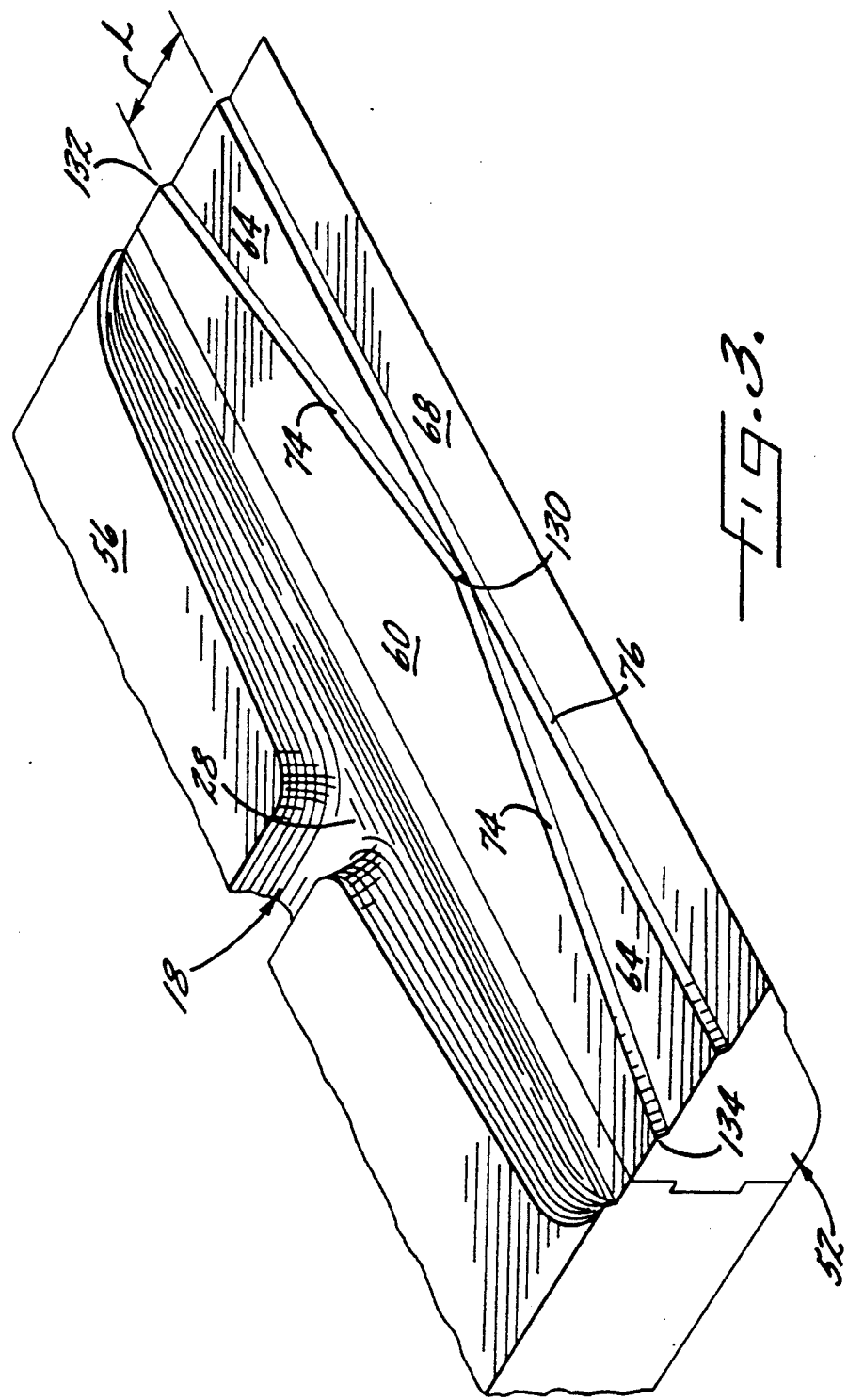

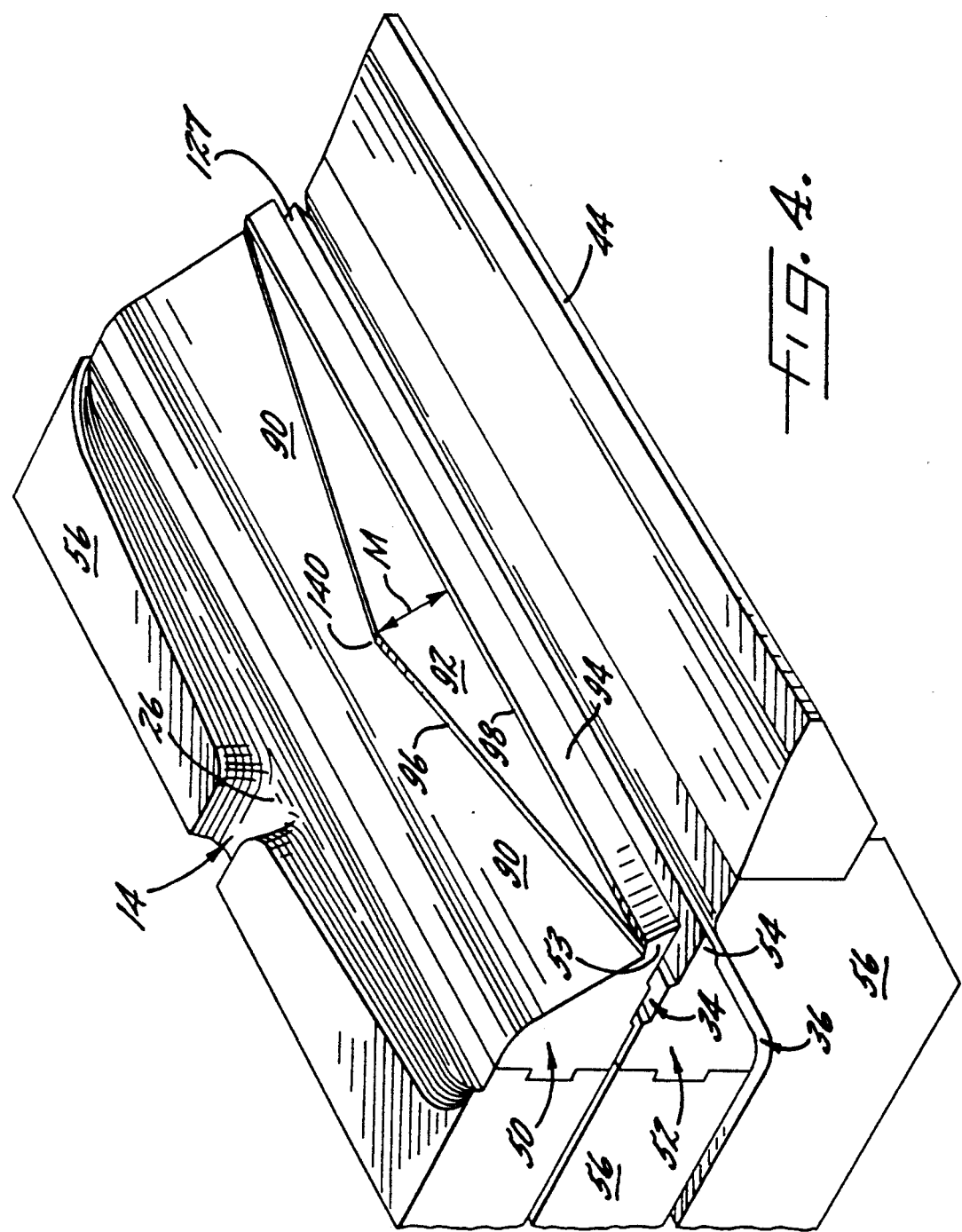

EXTRUSION PROCESS AND APPARATUS WITH MODIFIED PRELAND

This application is a continuation of application Ser. No. 852,825, filed Mar. 13, 1992 now abandoned, which is a continuation of application Ser. No. 653,067, filed Feb. 8, 1991, which is abandoned and is a divisional of application Ser. No. 550,516, filed Jul. 10, 1990, now abandoned.

BACKGROUND OF THE INVENTION

This invention relates to an extrusion apparatus, particularly to an extrusion apparatus having a modified preland channel.

As illustrated by U.S. Pat. Nos. 4,789,513 and 4,780,258, both to Peter F. Cloeren, a coextrusion apparatus including a removable die body with a coat hanger-type manifold and a conventional preland channel for producing substantially equal flow volume of a stream across the stream width, is known. Also known as exemplified by U.S. Pat. No. 4,600,550 to Peter Cloeren, is an extrusion apparatus having a restriction channel of increasing cross-sectional area from the center thereof to each end thereof, for causing a stream to flow at substantially equal pressure from side to side; however, effectiveness could be improved.

An interchangeable insert for modifying flow volume, would permit insert selection based upon for instance, stream rheology and in the case of a multimanifold extrusion die, also based upon the desired relative layer thickness of a composite. Rigid mounting of the insert would provide a fixed geometry to converging channels.

Therefore, there is a need for an improved extrusion apparatus that is effective in providing for substantially equal flow volume of a stream across the stream width. Beneficially, such an apparatus would include an interchangeable insert or inserts for enabling this result.

SUMMARY OF THE INVENTION

It is accordingly an object of the present invention to provide an improved extrusion apparatus that is effective in providing for substantially equal flow volume of a stream across the stream width.

It is a further object of the present invention to provide an extrusion apparatus that includes an interchangeable insert or inserts for providing for substantially equal flow volume.

Additional objects, advantages and novel features of the present invention are set forth in the description that follows, and in part will become apparent to those skilled in the art upon examination of the following description or may be learned by practice of the invention. The objects and advantages of the invention may be realized and attained by means of instrumentalities and combinations particularly pointed out in the appended claims.

To achieve the foregoing objects and in accordance with the purpose of the present invention, as embodied and broadly described herein, there is provided an improved extrusion apparatus. The apparatus includes a chamber for providing flow transverse to the main flow direction, and downstream of the chamber, a flow transition zone and a land channel in fluid communication therewith.

The flow transition zone includes a primary preland channel portion, and in direct fluid communication with the primary preland channel portion, a secondary preland channel portion. The secondary preland channel portion is of larger gap than the primary preland channel portion.

The primary preland channel portion is of progressively changing length in the main flow direction, from a side-to-side midpoint to the sides thereof. The secondary channel portion is of inversely changing length in the main flow direction, compared to the primary channel portion. However, the flow transition zone is of constant length from side to side.

The primary preland channel portion of the flow transition zone is of constant gap from side to side. Likewise, the secondary preland channel portion is of constant gap from side to side.

Beneficially, a removable insert at least in part provides the flow transition zone, and advantageously the land channel. The removable insert is advantageously rigidly mounted to a main body of the extrusion apparatus.

In the drawing and in the detailed description of the invention that follows, there are shown and essentially described only preferred embodiments of this invention, simply by way of illustration of the best mode contemplated of carrying out this invention As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawing, which forms a part of the specification of the present invention.

FIG. 3 is a partial, perspective view taken substantially along line 3—3 of FIG. 1, illustrating a preferred embodiment of an extrusion apparatus in accordance with the present invention; and FIG. 4 is a partial, perspective view taken substantially along line 4—4 of FIG. 1, illustrating another preferred embodiment of an extrusion apparatus in accordance with the present invention.

DETAILED DESCRIPTION OF THE INVENTION

As explained above, the present invention is directed to an improved extrusion apparatus that is effective in providing for substantially equal flow volume of a stream across the stream width. Advantageously, the present invention includes an interchangeable insert or inserts for providing for the substantially equal flow volume.

Figure 1:
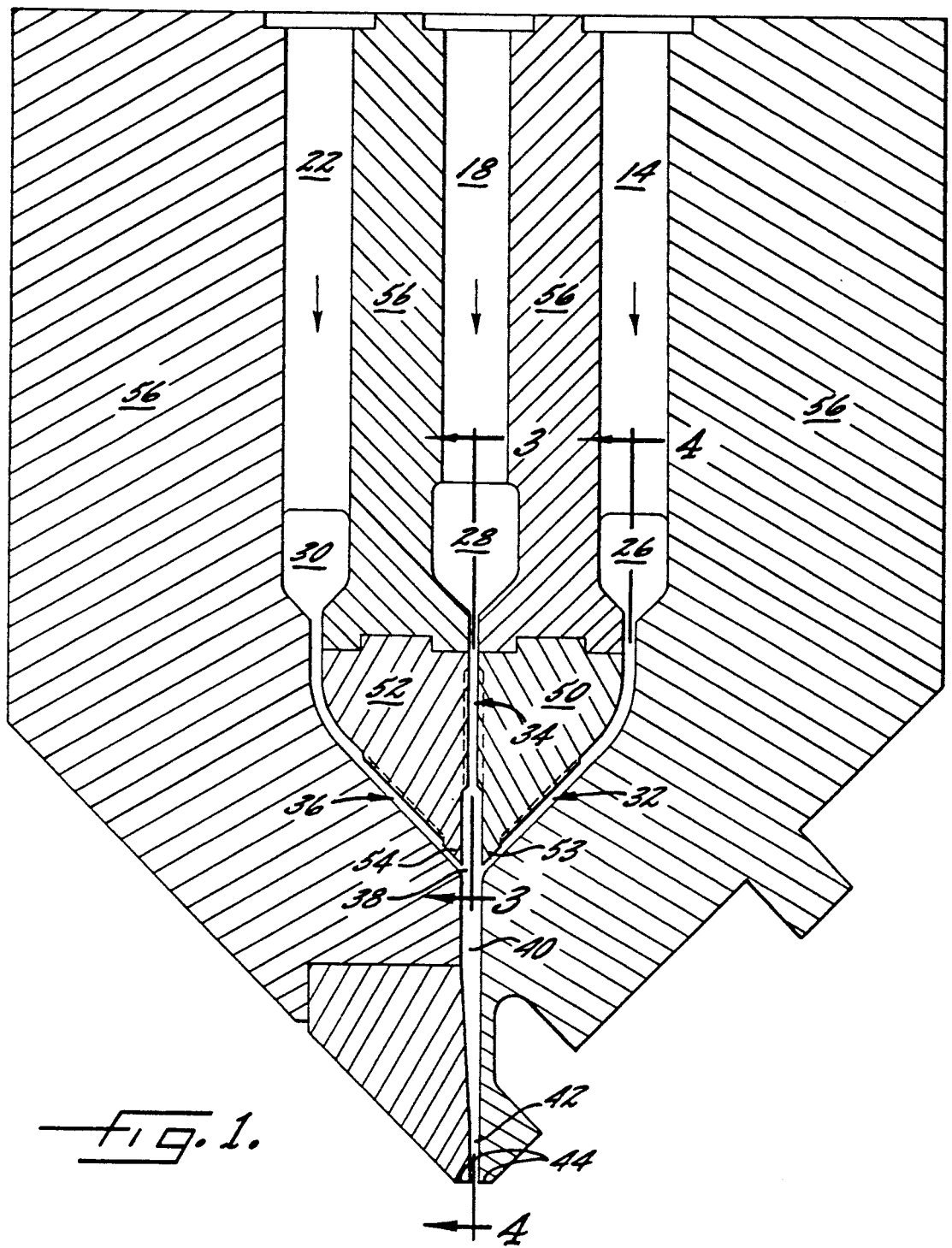
FIG. 1 is a cross-sectional view taken at the centerline of an extrusion apparatus, illustrating alternative preferred embodiments of an extrusion apparatus in accordance with the present invention, with arrows indicating the main direction of flow.

Referring to FIG. 1, alternative preferred embodiments of an extrusion apparatus in accordance with the present invention, are shown. Within the extrusion apparatus are flow channels 14,18,22. Flow channel 18 illustrates one such preferred embodiment, and flow channels 14,22 individually illustrate another preferred embodiment of an extrusion apparatus in accordance with the present invention.

Each of flow channels 14,18,22 beneficially includes a conventional T-shaped, transverse flow-providing chamber 26,28,30, commonly known as a manifold, for widthwise spreading of tho respective flow stream. As revealed in FIGS. 3 and 4, the manifolds decrease in cross-sectional area from a side-to-side midline to each side; however, the cross-sectional area could be constant across the manifold width. Flow stream pressure drop occurs across the manifold width.

Each of flow channels 14,,18,22 further includes, as explained in detail later, a non-adjustable two stage, flow transition zone 32,34,36 formed by the respective preland (or primary stage) and undercut preland (or secondary stage) channels, and downstream of the flow transition zone, a land channel. Each flow transition zone compensates for the pressure drop across the width of the respective upstream manifold.

Downstream from the manifolds and flow transition zones, the flow channels converge at a locus of convergence 38 to form an exit flow passage 40. No further transverse flow and thus no additional widthwise spreading of a flow stream, occur in the exit flow passage.

Exit passage 40 narrows at its exit end to form a land channel 42 of decreased gap. A composite stream exits through lips 44 of the extrusion apparatus, which is a multimanifold coextrusion die. In accordance with the invention, an adjustable flow-restricting member between the flow transition zone and the exit orifice formed by lips 44, is unnecessary. As will become understood, the present invention is applicable to a single manifold extrusion die.

Figure 2:
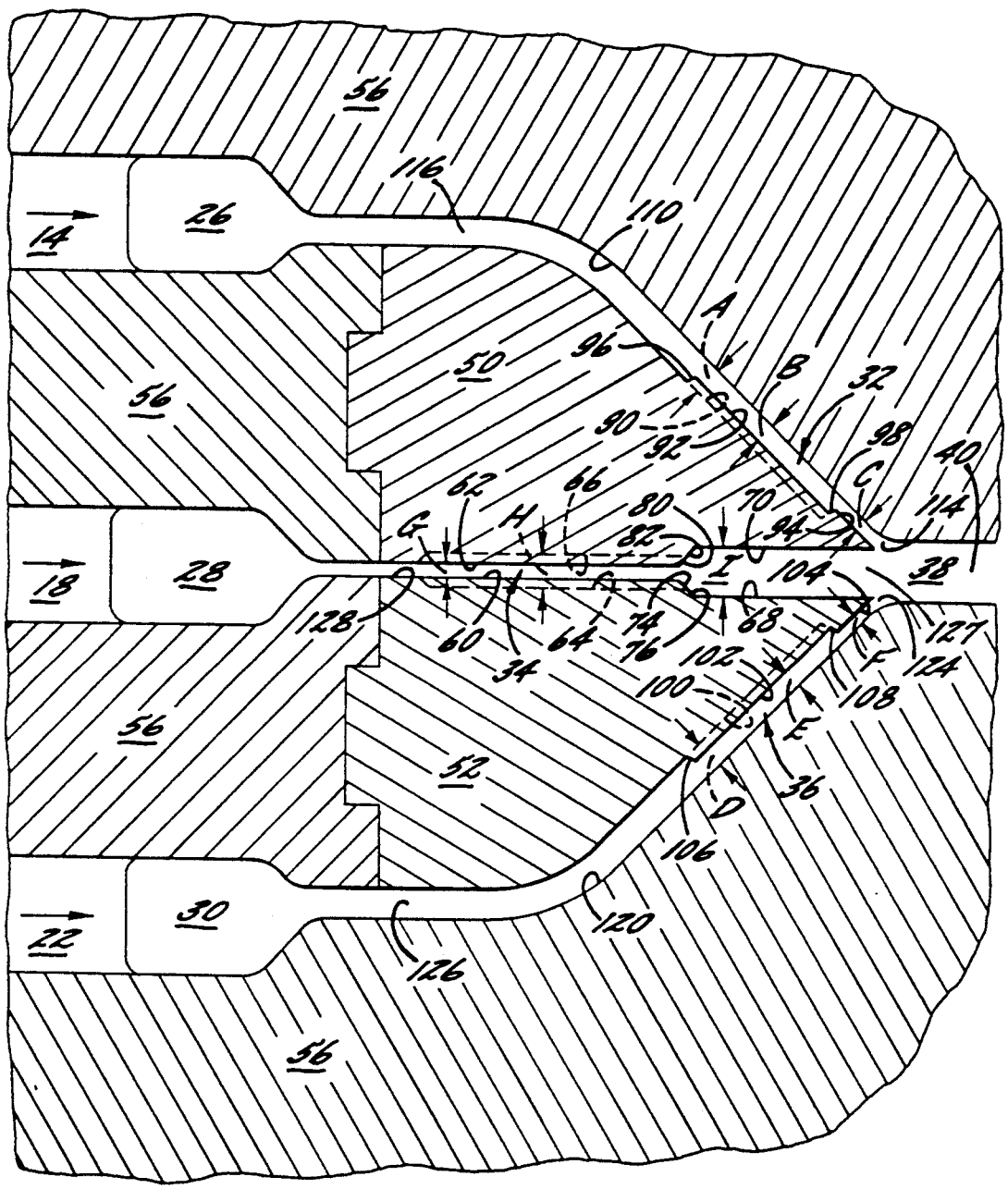
FIG. 2 is an enlargement of the cross-sectional view of FIG. 1, showing the interchangeable insert portion of the apparatus.

With reference also to FIG. 2, advantageously removable members 50,52, which terminate in pointed tips 53,54, are beneficially rigidly mounted to a main body 56 of the extrusion apparatus. Main body 56 provides manifolds 26,28,30. Removable inserts 50,52 cooperate to provide a section of center flow channel 18, which section, with reference also to FIG. 3, includes, in downstream order, prelands 60,62, undercut prelands 64,66 and lands 68,70.

Preland 62 and undercut preland 66 beneficially correspond in size and shape to prelands 60,64, respectively. Transition walls 74,76 bridge between raised surface 60 and surface 64, and between surfaces 64,68, respectively, and transition walls 80,82 connect raised surface 62 to surface 66 and connect surfaces 66,70, respectively.

External features of removable insert 50 are plainly seen in FIG. 4. In downstream order are undercut preland 90, preland 92 and raised land 94. A transition wall 96 connects face 90 to raised face 92, and a transition wall 98 bridges between faces 92,94.

The external features of insert 52 are identical to the just-described features of insert 50, and can be best seen from FIG. 2. FIG. 2 shows in downstream order, undercut preland 100, preland 102 and raised land 104. A transition wall 106 bridges between face 100 and raised face 102, and a transition wall 108 connects faces 102,104.

Referring further to FIG. 2, and with respect to side flow channel 14, a wall 110 of main body 56 and undercut preland 90 define an undercut preland channel having a gap A, wall 110 and preland 92 define a preland channel having a smaller gap B, and wall 110 and raised land or inner lip 94 define a land channel having an even smaller gap C. The undercut preland channel and preland channel form two stage, flow transition zone 32 of side flow channel 14.

The land channel, which has a constant length in the main flow direction, is in direct fluid communication with the flow transition zone. The orientation of the land channel is parallel to the flow transition zone. The land channel terminates in an exit orifice 114.

Conveniently, gap A of the secondary stage of the flow transition zone of side flow channel 14 is the same as the gap of an immediately upstream portion 116 of flow channel 14, which channel portion connects manifold 26 to flow transition zone 32. Gap B of the primary stage of the flow transition zone is flow-restricting. The gaps and lengths of the primary and secondary stages of zone 32 arc sufficient to produce an adequate back pressure in manifold 26 so as to provide uniform transverse distribution of a stream. Gap C of the land channel controls shear stress and flow velocity at the locus of channel convergence. Beneficially, each of gaps A,B,C is constant across the width of flow channel 14.

Gaps B and C may be the same as, or as shown in the drawing different from, one another, depending upon the rheology and flow rate of the stream to be passed through channel 14. Even when gap B is the same as gap C, gaps B,C function independently of one another.

Similarly with respect to side flow channel 22, a wall 120 of main body 56 and undercut preland 100 define an undercut preland channel having a gap D, wall 120 and preland 102 define a preland channel having a smaller gap E, and wall 120 and raised land or inner lip 104 define a land channel having an even smaller gap F. The undercut preland channel and preland channel form two stage, flow transition zone 36 of side flow channel 22. The land channel terminates in an exit orifice 124.

Similarly, gap D of the secondary stage of the flow transition zone of side flow channel 22 is conveniently the same as the gap of an immediately upstream portion 126 of flow channel 22, which channel portion connects manifold 30 to flow transition zone 36. Gap E of the primary stage of the flow transition zone is flow-restricting. Gap F of the land channel controls shear stress and flow velocity at the locus of channel convergence. Gaps E and F may be the same as, or as shown in the drawing different from, one another. Beneficially, each of gaps D,E,F is constant across the width of flow channel 22.

With continued reference to FIG. 2 and with respect to center flow channel 18, prelands 60,62 define a preland channel having a gap G, undercut prelands 64,66 define an undercut preland channel having a larger gap H, and lands 68,70 define a land channel having an even larger gap I. The preland channel and undercut preland channel form two stage, flow transition zone 34 of flow channel 18.

The land channel, which has a constant length in the main flow direction, is in direct fluid communication with the flow transition zone. The orientation of the land channel is parallel to the flow transition zone. The land channel terminates in an exit slot or inner lips 127.

Similar to the side flow channels, gap G of center flow channel 18 is conveniently the same us the gap of an immediately upstream portion 128 of flow channel 18, which channel portion connects manifold 28 to flow transition zone 34. Gap G of the primary stage of the flow transition zone is flow-restricting. The gaps and lengths of the primary and secondary stages of zone 34 are sufficient to produce an adequate back pressure in manifold 28 so as to provide uniform transverse distribution of a stream.

Gap I of the land channel controls shear stress and flow velocity at the locus of channel convergence. Advantageously, each of gaps G,H,I is constant across the width of center flow channel 18. Gap I is suitably constant in the main flow direction, but may be tapered.

Gaps H and I may be the same as, or as shown in the drawing different from, one another, depending upon the rheology and flow rate of the stream to be passed through channel 18. Even when gap H is the same as gap I, gaps H,I function independently of one another.

As can be seen in FIG. 3, preland 60 has a longer length in the flow direction, at a side-to-side midpoint 130 than at its sides. The length at midpoint 130 is measured from midpoint 130 to an imaginary line defined by points 132,134 located at the loci of intersection of transition wall 74 and the ends of insert 52. As explained earlier, preland 62 corresponds in size and shape to preland 60, and these prelands cooperate to form the preland channel of flow channel 18. As can be therefore understood and with reference to FIG. 2, the preland channel of flow channel 18 gradually increases in length in the main flow direction, from the sides to the midpoint.

In comparison, undercut preland 64 has a longer length in the flow direction, at its sides (designated L) than at midpoint 130. The length at the sides is measured from transition wall 74 to transition wall 76. As can therefore be understood and again with reference to FIG. 2, the undercut preland channel of flow channel 18 gradually decreases in length in the main flow direction, from the sides to the midpoint.

Together, the preland and undercut preland channels of center flow channel 18 form two stage, flow transition channel 34 (shown best in FIG. 2), which has a constant length in the main flow direction, from side to side of flow channel 18. Thus, the dimensional changes of the preland and undercut preland channels of the flow transition zone are inverse, and the length at midpoint 130 is the same as length L at the sides.

A relatively longer channel length results in a relatively increased resistance to flow and relatively decreased flow volume; whereas, a relatively shorter channel length results in a relatively decreased resistance to flow and relatively increased flow volume. The length at midpoint 130, which is the same as length L, is selected to compensate for the pressure drop from a side-to-side midline of manifold 28 to each side thereof. This length is conveniently selected after selecting the flow transition zone gaps appropriate for polymer(s) used.

From each side of channel 18 to midpoint 130, there is a progressive increase in the resistance to flow provided by the primary stage of flow transition zone 34, and a progressive decrease in the flow volume. Conversely, from each side of channel 18 to midpoint 130, there is a progressive decrease in the resistance to flow provided by the secondary stage of flow transition zone 34, and a progressive increase in the flow volume. This transitional flow effect provides for substantially equal flow volume of a stream across the channel width as the stream exits the flow transition zone.

As can be seen in FIG. 4, preland 92 of side flow channel 14 has a longer length in the flow direction, at a side-to-side midpoint 140 (designated M) than at its sides. The length at midpoint 140 is the distance from midpoint 140 to wall 98. In comparison, undercut preland 90 of side flow channel 14 has a longer length in the flow direction, at its sides than at midpoint 140. The length at the sides is measured from transition wall 96 to an imaginary line defined by a line parallel to transition wall 98 and that intersects midpoint 140. As can be therefore understood and with reference to FIG. 2, the preland channel of channel 14 progressively decreases in length in the main flow direction, from the midpoint to the sides, and the undercut preland channel of channel 14 progressively increases in length in the main flow direction, from the midpoint to the sides.

Together, the preland and undercut preland channels of side flow channel 14 form two stage, flow transition channel 32 (shown best in FIG. 2), which has a constant length in the main flow direction, from side to side of flow channel 14. Thus, dimensional changes of the preland and undercut preland channels of the transition zone are inverse, and the length at the sides of the transition channel is the same as length M at midpoint 140.

From midpoint 140 to each side of channel 14, there is a progressive decrease in the resistance to flow provided by the primary stage of flow transition zone 32, and a progressive increase in the flow volume. Conversely, from midpoint 140 to each side of channel 14, there is a progressive increase in the resistance to flow provided by the secondary stage of flow transition zone 32, and a progressive decrease in the flow volume. This transitional flow effect provides for substantially equal flow volume of a stream across the channel width as the stream enters the land channel of channel 14.

A like transitional flow effect occurs in flow transition zone 36 (shown best in FIG. 2) of side flow channel 22. Thus, transition zone 36 provides for substantially equal flow volume of a stream across the width of channel 22 as the stream exits the flow transition zone.

As pointed out earlier, flow channel 14 illustrates one preferred embodiment of an extrusion apparatus in accordance with the present invention, and flow channels 18 and 22 individually illustrate another preferred embodiment of an extrusion apparatus in accordance with the present invention. Because the present invention is applicable to a single manifold extrusion die, either of these embodiments could be used in a single manifold extrusion die. In such case, there is typically not direct fluid communication of the flow transition zone to the land channel. When used in a multimanifold extrusion die, the embodiments may be combined as shown.

With continued reference to FIG. 2, at locus of convergence 38, flow channels 14,18,22 converge to form exit flow passage 40. The angle of convergence of center flow channel 18 and either side channel provides for convergence of flow stream faces. A land channel portion of a flow channel should have a gap that matches the shear stress or flow velocity of a stream exiting therefrom, to that of a stream exiting the adjacent flow channel.

The rigid mounting of removable inserts 50,52 and the cooperation of walls of main body 56 with faces of the inserts to form the two stage, flow transition zones and land channels of side flow channels 14,22 provide a mixed geometry to the side channels. Accordingly, a constant proportionality between the output of these side flow channels and the center flow output can be maintained.

Removability of an insert beneficially provides for interchangeability with an insert suitable for the rheologies of a stream to be processed or suitable for producing a composite having the desired relative layer thickness.

Operation of the coextrusion apparatus shown in the drawing will now be described. Removable inserts 50,52 are selected for use and rigidly mounted to main body 56 of the multimanifold extrusion die. Selection of suitable inserts is based upon for instance, stream rheology and the desired relative layer thickness of the composite.

In operation, with respect to center flow channel 18, a flow stream undergoes transverse flow in the I-shaped manifold and encounters a pressure drop across the width of the manifold as a result of which the stream has a greater flow pressure at a side-to-side midline than at the sides. Thereafter, the stream passes through flow transition zone 34, after which the stream has substantially equal flow volume across the width of flow channel 18, and passes through the land channel.

Similarly, streams pass through flow channels 14,22 and are caused to have substantially equal flow volume across the width of the respective flow channel, as they exit the respective flow transition zone. Then, the streams pass through the respective land channel.

Pointed tips 53,54 of inserts 50,52 mechanically displace flow of the stream exiting center flow channel 18. At locus of convergence 38, the streams converge to form a composite. The composite is thereafter passed through exit flow passage 40, land channel 42, and lips 44 of the multimanifold die.

Having described the invention in detail and by reference to preferred embodiments thereof, it will be apparent that modifications and variations are possible without departing from the scope of the invention defined in the appended claims. Several changes or modifications have been briefly mentioned for purposes of illustration.

I claim:

1. An extrusion process comprising passing a flow stream through a channel portion in which flow stream pressure drop and distribution occur thereafter providing said flow stream which has substantially unequal flow volume across the steam width, with substantially equal flow volume across the stream width, by passing said flow stream through a damming zone designed to be non-adjustable and to comprise different gaps and of a length designed to compensate for said pressure drop, said damming zone length being comprised of a primary damming stage, and a secondary damming stage of complementary damming effect compared to said primary damming stage, and in direct fluid communication therewith; and thereafter passing said flow stream through an exit orifice free of any contact with an intervening, adjustable flow-restricting member.

2. The extrusion process of claim 1, wherein said length is selected after selecting said gaps.

3. The extrusion process of claim 1, wherein the step of passing said flow stream through said non-adjustable, damming zone comprises passing said flow stream through said second damming stage prior to said primary damming stage, which is of relatively smaller gap.

4. The extrusion process of claim 3, further comprising passing said flow stream exiting from said non-adjustable, damming zone, through an additional zone of smaller gap that said primary stage.

5. The extrusion process of claim 1, wherein the damming zone design is rheology-dependent.

6. An extrusion apparatus comprising a channel portion in which flow stream pressure drop and distribution occur; and downstream of said channel portion, means for providing a flow stream having substantially unequal flow volume across the stream width, with substantially equal flow volume across the stream width, comprising a non-adjustable damming zone having different gaps and of a length adapted to compensate for said pressure drop, said damming zone length being comprised of a primary damming stage and in direct fluid communication therewith, a secondary damming stage of complementary, changing length relative to said primary damming stage and of greater gap than said primary damming stage, said means being free of an adjustable flow-restricting member between said non-adjustable, damming zone and an exit orifice.

7. The extrusion apparatus of claim 6, wherein said channel portion in which said flow stream pressure drop and distribution occur is a transverse flow-providing channel portion.

8. The extrusion apparatus of claim 6 wherein said channel portion in which said flow stream pressure drop and distribution occur, has a rectilinear output edge.

9. The extrusion apparatus of claim 6, wherein said primary damming stage has a greater length at a side-to-side midpoint than at either of said sides.

10. The extrusion apparatus of claim 6, wherein said primary damming stage and said secondary damming stage are each of constant gap from side to side.

11. The extrusion apparatus of claim 6, wherein said non-adjustable, damming zone is provided by a removably mounted insert.

12. An extrusion apparatus comprising
a channel portion in which flow stream pressure drop and distribution occur;
downstream of said channel portion, means for providing a flow stream having substantially unequal flow volume across the stream width, with substantially equal flow volume across the stream width, comprising a non-adjustable, damming zone having different gaps and of a length adapted to compensate for said pressure drop, said damming zone length being comprised of a primary damming stage and directly upstream thereof, a secondary damming stage of complementary, changing length relative to said primary damming stage and of greater gap than said primary damming stage, said means being free of an adjustable flow-restricting member between said non-adjustable, damming zone and an exit orifice; and
a zone of smaller gap than said primary damming stage, disposed downstream of said primary damming stage.

13. The extrusion apparatus of claim 12, wherein said channel portion in which flow stream pressure drop and distribution occur, is a transverse flow-providing channel portion.

14. The extrusion apparatus of claim 12, wherein said channel portion in which flow stream pressure drop and distribution occur, has a rectilinear output edge.

15. The extrusion apparatus of claim 12, wherein said primary damming stage has a greater length at a side-to-side midpoint than at either of said sides.

16. The extrusion apparatus of claim 12, wherein said primary damming stage and said secondary damming stage are each of constant gap from side to side.

17. The extrusion apparatus of claim 12, wherein said non-adjustable, damming zone is provided by a removably mounted insert.

* * * * *